S. WIESENBERG & S. LUSTIG.
PNEUMATIC WHEEL TIRE OVERSHOE.
APPLICATION FILED AUG. 24, 1917.
1,250,742.
Patented Dec. 18, 1917.
2 SHEETS—SHEET 1.
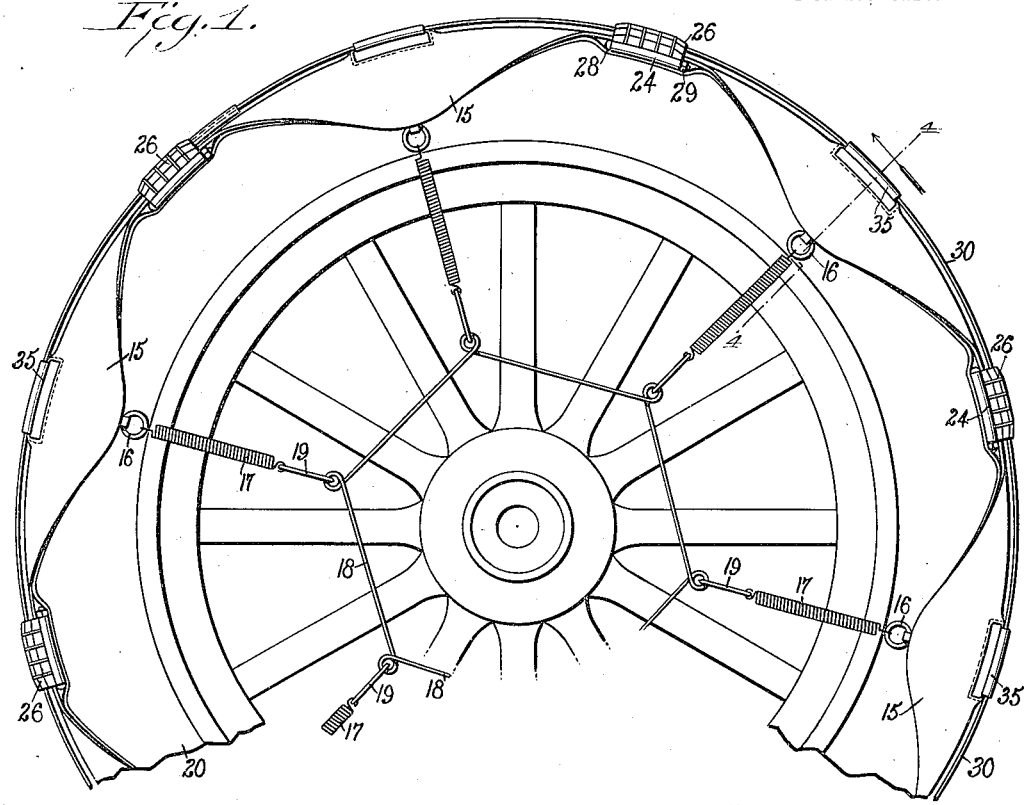
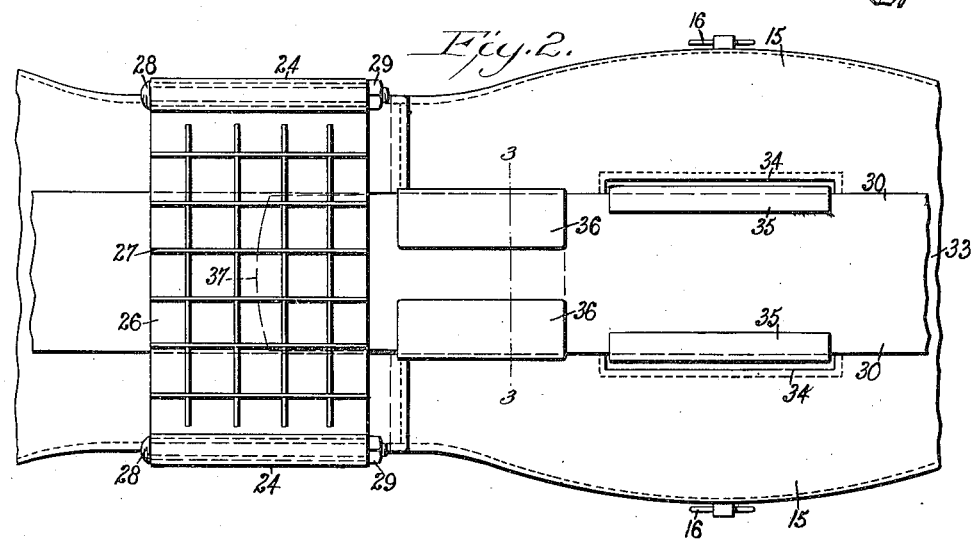
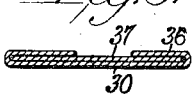
WITNESSES
INVENTORS
S. Wiesenberg
S. Lustig
BY
ATTORNEYS

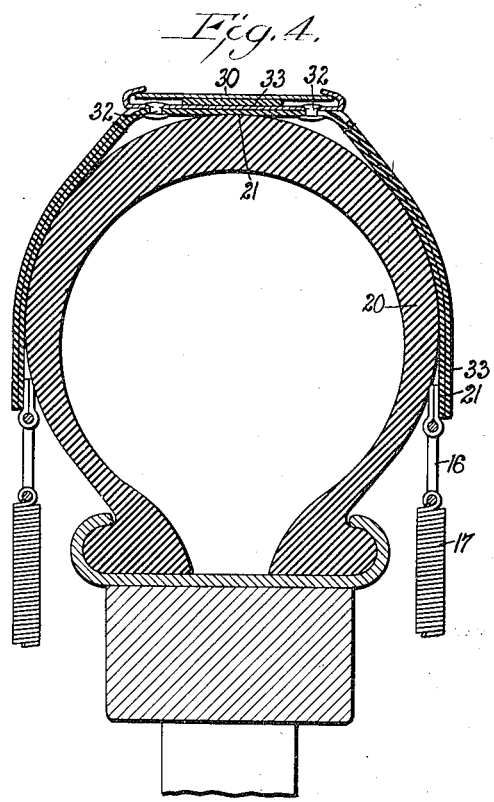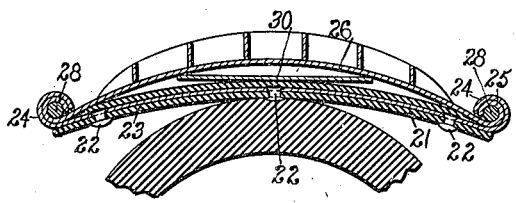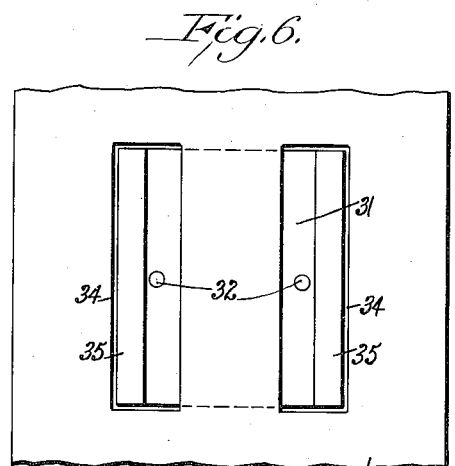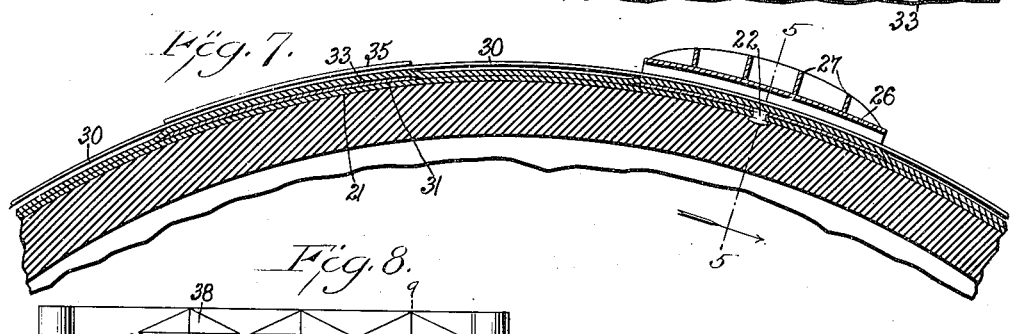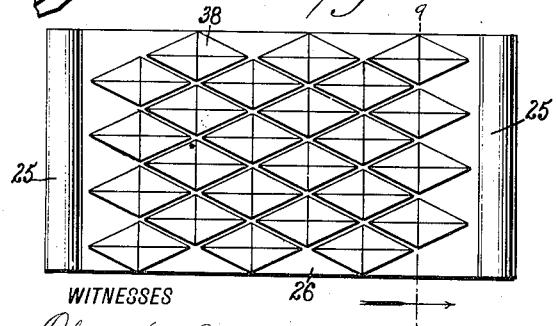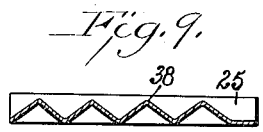

UNITED STATES PATENT OFFICE.

SAMUEL WIESENBERG AND SAMUEL LUSTIG, OF NEW YORK, N. Y.

PNEUMATIC-WHEEL-TIRE OVERSHOE.

1,250,742.

Specification of Letters Patent.   Patented Dec. 18, 1917.

Application filed August 24, 1917.   Serial No. 187,997.

*To all whom it may concern:*

Be it known that we, SAMUEL WIESENBERG, a subject of the Emperor of Austria, and SAMUEL LUSTIG, a citizen of the United States, both residents of the city of New York, borough of the Bronx, in the county of Bronx and State of New York, have invented a new and Improved Pneumatic-Wheel-Tire Overshoe, of which the following is a full, clear, and exact description.

Among the principal objects which the present invention has in view are: to provide a wearing surface for pneumatic tires; to prevent side slipping or skidding; to avoid damage to the tires; and to simplify the construction.

Drawings.

Figure 1 is a side view of a fragment of a wheel having a pneumatic tire and an overshoe therefor constructed and arranged in accordance with the present invention;

Fig. 2 is a face view of a fragment of an overshoe constructed and arranged in accordance with the present invention;

Fig. 3 is a cross section taken as on the line 3—3 in Fig. 2;

Fig. 4 is a cross section of a wheel rim, tire and overshoe therefor constructed and arranged in accordance with the present invention, the section being taken as on the line 4—4 in Fig. 1;

Fig. 5 is a cross section of a tire and skid-preventing section of the overshoe, the section being taken as on the line 5—5 in Fig. 7;

Fig. 6 is a surface view of a fragment of the overshoe showing means for holding the puncture-preventing member in service relation to the overshoe;

Fig. 7 is a longitudinal section showing a fragment of the tire shoe and overshoe therefor;

Fig. 8 is a face view showing a modified form of the anti-skidding device used in connection with the overshoe;

Fig. 9 is a cross section of the same, the section being taken as on the line 9—9 in Fig. 8.

Description.

As seen in the drawings, the overshoe has a flexible cover, the lateral edges whereof are shaped to provide side tabs 15. Each of the tabs 15 is provided with an attaching ring 16 for engaging the end of a spring 17. The springs 17 are connected in service with bridles 18, by means of loops 19. The two bridles employed at opposite sides of the wheel encircle the hub thereof and in service are held substantially concentric with said hub. In service, the springs 17 exert a pulling strain on the tabs 15 sufficient to hold the overshoe, of which the tabs are a part, firmly on the tire 20.

As seen best in Fig. 5 of the drawings, the under layer of the fabric 21 of the overshoe is fixedly attached, by means of rivets 22, to resilient plates 23. The plates 23 have at their lateral edges, curled retainers 24, within the circular channels of which are inserted the curled edges 25 of the shoe plates 26. As shown best in Fig. 2 of the drawings, the plates 26 are provided with suitable friction devices 27, which cut through the overlaid stratum of mud, oil, or water deposit accumulated on the roadbed. The plates 26 are held in service on the plates 23 by bolts 28 and nuts 29 provided therefor.

It will be understood that as many plates 26 as desired may be used on the overshoe herein disclosed. Also, it will be understood that the plates may be extensively varied to provide skid-preventing surfaces of various types for various services.

It is the purpose of the flexible metal band 30 to prevent puncturing or cutting the tire, and with this end in view, the band 30 is extended around the overshoe and is held in service thereon by slide plates 31. The slide plates 31 are fixedly attached by rivets 32 to the inner layer of the fabric of the overshoe. As seen best in Fig. 6 of the drawings, the outer layer 33 of the fabric has openings 34 through which extend the curled edges 35 of the plates 31. The edges 35 form with the plates 31, narrow channels through which the band 30 extends, as seen best in Fig. 7 of the drawings.

The ends of the band 30 are slidably attached, as shown best in Fig. 2 of the drawings, the extremity of one end of the band being provided with sliding clips 36, through which the other end 37 of the band extends, as shown best in Fig. 3 of the drawings. This arrangement permits the contraction and expansion in service of the band 30 and also admits of readily installing the band in service.

In Figs. 8 and 9, a modified form of wearing surface for the plates 26 is shown. In the modified form, the body of the plate 26 is pressed to form a number of burs 38. The burs 38 serve as abrasive points for cutting through any slimy deposit on the roadbed. It is obvious that the plates 26 may be installed or removed at will, and that these operations are simplified, requiring only that the nuts 29 be removed so that the bolts 28 may be withdrawn to release the said plates, which are then laterally forced through the channels under the retainers 24. When the plates 26 are removed, the band 30 continues its operation as a safeguard against the cutting of the shoe of the tire 20.

Claims.

1. An overshoe as characterized comprising a flexible cover for a tire; means for maintaining said cover in service relation; and wearing members detachably secured on said cover for interposition between the same and a road-bed, said means embodying a split metallic band, and means for holding the same slidably connected with said cover.

2. An overshoe as characterized comprising a flexible cover for a tire; means for maintaining said cover in service relation; and wearing members detachably secured on said cover for interposition between the same and a roadbed, said means embodying a split metallic band, and a plurality of clips forming channels for holding said band slidably mounted on said cover.

3. An overshoe as characterized comprising a flexible cover for a tire; means for maintaining said cover in service relation; and wearing members detachably secured on said cover for interposition between the same and a roadbed, said means embodying a split metallic band, and a plurality of plates permanently attached to said cover, said plates having overturned edges forming channels for slidably holding said band.

4. An overshoe as characterized comprising a flexible cover for a tire; means for maintaining said cover in service relation; wearing members detachably secured on said cover for interposition between the same and a roadbed, said means embodying a split metallic band, and means for holding the same slidably connected with said cover; and means for holding the free ends of said band in mutual sliding relation.

5. An overshoe as characterized comprising a flexible cover for a tire; means for maintaining said cover in service relation; wearing members detachably secured on said cover for interposition between the same and a roadbed, said means embodying a split metallic band, and means for holding the same slidably connected with said cover; and means for holding the free ends of said band in mutual sliding relation, said means embodying clips mounted on one free end for forming sliding channels for the other free end.

6. An overshoe as characterized comprising a flexible cover for a pneumatic tire; means for maintaining said cover in service relation; a plurality of friction members detachably secured on said cover to form a wearing surface for the same; and means for detachably mounting said members on said cover, said means embodying a plurality of retaining plates having lateral edges overturned to form open-ended channels, and a plurality of overturned members on said friction members adapted for insertion in said channels.

7. An overshoe as characterized comprising a flexible cover for a pneumatic tire; means for maintaining said cover, in service relation; a plurality of friction members detachably secured on said cover to form a wearing surface for the same; means for detachably mounting said members on said cover, said means embodying a plurality of retaining plates having lateral edges overturned to form open-ended channels, and a plurality of overturned members on said friction members adapted for insertion in said channels; and means for retaining said overturned members and edges in service relation.

8. An overshoe as characterized comprising a flexible cover for a pneumatic tire; means for maintaining said cover in service relation; a plurality of friction members detachably secured on said cover to form a wearing surface for the same; means for detachably mounting said members on said cover, said means embodying a plurality of retaining plates having lateral edges overturned to form open-ended channels, and a plurality of overturned members on said friction members adapted for insertion in said channels; and means for retaining said overturned members and edges in service relation, said means embodying bolts extending through said overturned members and channels for locking the same.

9. An overshoe as characterized comprising a flexible cover for a pneumatic tire; means for maintaining said cover in service relation; a plurality of friction members detachably secured on said cover forming a wearing surface for the same; means for detachably mounting said members on said cover, said means embodying a plurality of retaining plates having lateral edges overturned to form open-ended channels, and a plurality of overturned members on said friction members adapted for insertion in said channels; means for retaining said overturned members and edges in service relation, said means embodying bolts extending through said overturned members and channels for locking the same; and a split-ended flexible metallic wearing band extending beneath and between said friction members, said friction members forming sliding channels for said band.

SAMUEL WIESENBERG.
SAMUEL LUSTIG.